United States Patent [19]
Picault

[11] Patent Number: 5,122,898
[45] Date of Patent: Jun. 16, 1992

[54] ACOUSTO-OPTICAL DEFLECTOR

[75] Inventor: Jean-Pierre C. Picault, Arpajon, France

[73] Assignee: A.A.SA, France

[21] Appl. No.: 696,500

[22] Filed: May 7, 1991

[30] Foreign Application Priority Data

May 9, 1990 [FR] France ............... 90 05763

[51] Int. Cl.$^5$ .................... G02B 26/08; G02F 1/33
[52] U.S. Cl. .................... 359/298; 359/310; 359/313; 359/314
[58] Field of Search ............... 359/298, 305, 310, 313, 359/314

[56] References Cited

U.S. PATENT DOCUMENTS

| | | | |
|---|---|---|---|
| 3,740,117 | 6/1973 | Hubby, Jr. | 359/313 |
| 3,985,426 | 10/1976 | McNaney | 359/310 |
| 4,110,016 | 8/1978 | Berg et al. | 359/310 |
| 4,330,178 | 5/1982 | McNaney | 359/350 |
| 4,443,066 | 4/1984 | Freyre | 359/305 |
| 4,541,694 | 9/1985 | Sullivan et al. | 359/305 |

FOREIGN PATENT DOCUMENTS 2632082 12/1989 France .
58-57110 4/1983 Japan .

Primary Examiner—Eugene R. LaRoche
Assistant Examiner—Evelyn A Lester
Attorney, Agent, or Firm—Rosenman & Colin

[57] ABSTRACT

An acousto-optical deflector disclosed, comprising, two crystals and two piezoelectric transducers associated respectively with the crystals and controlled by a variable frequency RF signal for generating, in the crystals, ultrasonic waves of the same frequency. The crystals are aligned along an acoustic axis for receiving in the aggregate a single incident light beam and generating a single diffracted beam and being spaced apart from each other by a gap creating an acoustic discontinuity without deforming the light beam.

4 Claims, 1 Drawing Sheet

ACOUSTO-OPTICAL DEFLECTOR

BACKGROUND OF THE INVENTION

The present invention relates to an acousto-optical deflector. It is a component comprising essentially a crystal used as interaction medium between an ultrasonic wave and an incident light wave for diffracting and so deflecting this light wave. Such a component is sometimes designated under the name of Bragg cell. The applications of such a deflector are various. It can be used in the aerospatial field. It can also be used as a deflection mirror in laser printers.

An acousto-optical deflector comprises then more precisely a crystal and a piezoelectric transducer controlled by a radiofrequency (RF) generator, for generating an ultrasonic wave in the crystal and causing its diffraction index to vary.

An incident light beam then gives rise in the crystal to a beam diffracted in the plane of the acoustic waves and luminous, deflected through an angle depending on the frequency of the acoustic wave. A diffracted beam coming from an incident light beam, even if the latter is a parallel beam, cannot be focussed on a point. A beam diffracted by an acousto-optical deflector always diverges. It is focussed in a spot whose dimension is limited, downwards, by the diffraction itself.

In the application to printers, the following parameters are to be considered:
length of the printing line,
dimension of the image element, or pixels,
number of pixels per line or resolution,
time for scanning a line.

The dimension of the pixels corresponds to the dimension of the spot limiting the diffracted beam. A line is scanned by varying the acoustic frequency. It must then be recalled that an incident beam only gives rise to a diffracted beam after the sound wave, in the crystal, has passed through the incident light beam. It is a question of the random access time which depends naturally on the opening of the incident light beam. Finally, the resolution of printers using an acousto-optical deflector is proportional to this beam opening and to the width of the spectrum of the acoustic frequencies, i.e. the acoustic pass-band.

Such reminders being given, it can be announced that the problem which the Applicant has sought to solve and which is at the origin of his invention is that of increasing the resolution of acousto-optical deflector printers without increasing the line scan time.

SUMMARY OF THE INVENTION

The present invention thus relates to an acousto-optical deflector characterized by the fact that it comprises, in a case, a plurality of crystals and a plurality of piezoelectric transducers associated respectively with the crystals and controlled by a variable frequency RF signal for generating, in the crystals, ultrasonic waves of the same frequency, the crystals being aligned along an acoustic axis for receiving in the aggregate a single incident light beam and generating a single diffracted beam and being spaced apart from each other by a gap creating an acoustic discontinuity without deforming the light beam.

Optically, the deflector of the invention behaves then like a prior art deflector with a single crystal, of a length equal to the sum of the lengths of the crystals of the proposed deflector, for increasing correspondingly the opening of the light beam and so, in the case of a printer, its resolution. Besides the fact that the commercially available crystals are limited in length, and since it was impossible then to find one of a length adapted to the desired resolution and since the width of the spectrum of the acoustic frequencies is also limited, for physical reasons, the merit of the Applicant is that he proposed this acoustic discontinuity which alone maintains a tolerable line scan time. It was not in fact sufficient to increase the length of a crystal and widen the spectrum of the acoustic frequencies for solving the problem of the invention. The inventive idea of the Applicant has also consisted in apprehending the problem not from the point of view of the resolution R but of a useful resolution $R_u$ which he developed.

We saw above that R is given by the relation $$R = k\phi\Delta F$$

in which
$\phi$ is the opening diameter of the light beam,
$\Delta F$ is the acoustic pass-band, and
k a factor of proportionality.

As for $R_u$ it is given by the relation $$R_u = R\left(1 - \frac{\tau}{T}\right)$$
$$= k\phi\Delta F\left(1 - \frac{\tau}{T}\right)$$

in which:
$\tau$ is the random access time and
T is the line scan time corresponding to the duration of the frequency sweep from one end to the other of the acoustic spectrum.

The notion of useful resolution $R_u$ is based on the discovery that the first point of a line is only printed after a time $\tau$ and that the useful pass-band, consequently, is only equal to $$\Delta F(1 - \tau/T).$$

The advantage of the invention resides then in increasing the opening of the incident light beam without for all that increasing, through the acoustic discontinuities, the random access time and without, consequently, having to increase the scanning period of a printing line. By way of example, when two identical crystals are used, the resolution can be multiplied by two.

It should be emphasized here that although the Applicant has proposed his invention while seeking to solve a printer resolution problem, he does not for all that limit it to such an application.

In an advantageous embodiment of the deflector of the invention, the transducers are adapted to be controlled by the same RF generator, but several generators may also be used.

Preferably, the piezoelectric transducers of the two end crystals are associated respectively with two opposite external acoustic input faces of the crystals.

BRIEF DESCRIPTION OF THE DRAWINGS

The invention will be better understood from the following description of one of the preferred embodiments of the deflector of the invention, with reference to the accompanying drawings in which.

DESCRIPTION OF THE PREFERRED EMBODIMENTS

Figure 1:
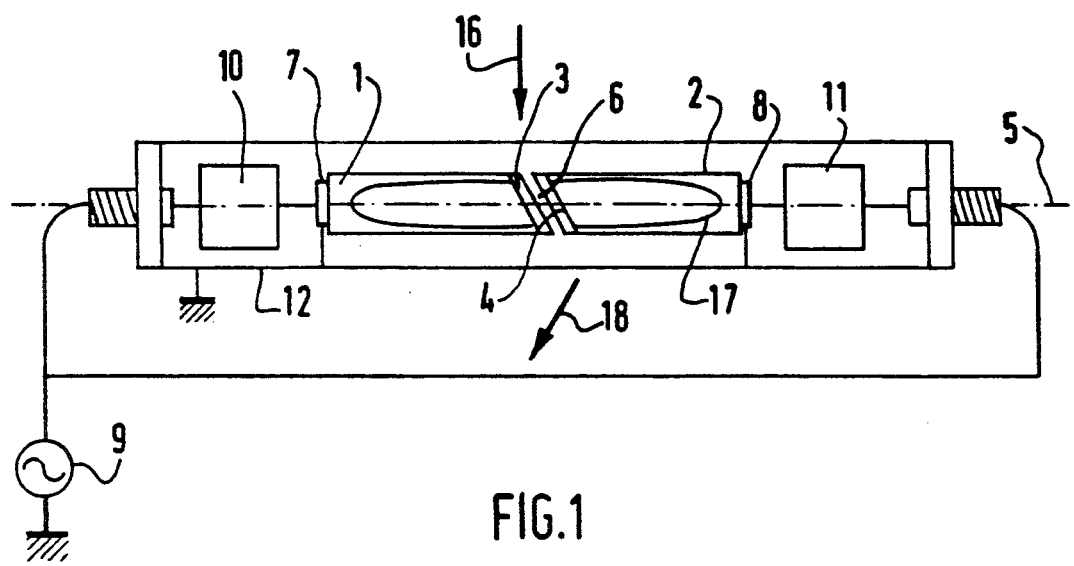
FIG. 1 is an overall view of the deflector of the invention.
Figure 2:
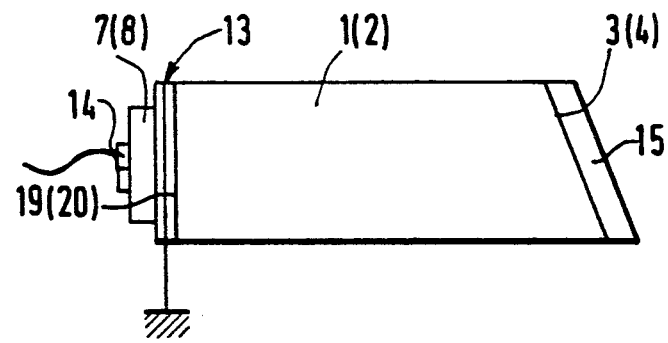
FIG. 2 is an enlarged view of the piezoelectric transducer associated with one of the two crystals of the deflector of FIG. 1.

The deflector shown in the figures comprises two identical bevelled crystals 1 and 2 mounted head to tail with their bevelled faces 3, 4 adjacent and aligned along an acoustic axis 5. The crystals are spaced apart by a gap 6 of very small width.

With the two crystals 1 and 2 are associated, by their external acoustic input face 19 (20) opposite the bevelled face, two piezoelectric transducers 7, 8 each connected to ground and to a variable frequency RF generator 9 via an electric matching circuit 10, 11. The above elements are disposed in a grounded case 12.

Each piezoelectric transducer 7, 8 is here in fact disposed between bonding layers 13, on the input face of the associated crystal 1, 2, connected to ground and an external electrode 14 connected to the RF generator 9 and defining the active zone of the transducer. The bevelled face 3, 4 of crystals 1, 2 is covered with an absorbent layer 15.

The two crystals 1, 2 are disposed so as to receive on aggregate an incident light beam in the form of an oblong pencil beam, with axis 16 perpendicular to the acoustic axis 5, here in the plane of the drawing of FIG. 1 although, for reasons of understanding, its trace 17 on the crystal has been shown in the plane of this drawing.

Generator 9 is intended to control transducers 7, 8 for generating, along axis 5, two ultrasonic waves in the two crystals 1, 2 separated from each other from the acoustic point of view by the gap 6, whereas, from the light point of view, they only form one of a length twice that of each of them. In other words, gap 6 does not deform the light beam 17.

Under the action of the ultrasonic waves of the same frequency generated in crystals 1, 2, the incident light beam with axis 16 gives rise to a single diffracted beam with axis 18 contained in the plane formed by axes 5 and 6 but slanted with respect to axis 16, the slant varying with the variable frequency of generator 9.

The deflector thus described behaves as a single crystal deflector, twice as long, which may then receive an incident light beam with an opening twice that of the beam which each crystal could receive individually. Because of the acoustic discontinuity 6, the random access time of the assembly remains however equal to that which would be associated with each crystal.

Thus, and in the case of the above described deflector being used as a scanning mirror for a printer, for example a laser beam printer, the resolution thereof is doubled, with respect to that which would be defined by a deflector having only one of these crystals, without for all that having to increase the scanning period since the random access time is conserved.

As crystals, paratellurite ($TeO_2$) or lead molybdate ($PbMoO4$) crystals may for example be considered.

Tests have been carried out on crystals having dimensions $6 \times 6 \times 12$ mm, spaced apart by a gap of about 10 microns, with a pencil light beam having an opening of 20 mm. It will be noted that the function of the bevelled faces 3, 4 in combination with that of the absorbent layers 15, is to prevent the ultrasonic wave reflected from these faces from disturbing the incident waves generating the diffracted light beam and so causing a second diffraction.

The thickness of the transducers is defined as a function of the ultrasonic frequencies to be generated. The transverse dimensions of the external electrodes 14 are determined so as to ensure collimation of the acoustic waves as far as the end of the crystals, i.e. as far as their bevelled face 3, 4, and so that the acoustic pass-band may be generated throughout the whole of its extent. Since a piezoelectric transducer has an electric impedance with a purely capacitive part and a purely piezoelectric real and imaginary part, the purpose of circuits 10, 11 is to match the impedance of the Bragg cell, which forms the deflector, to the impedance of the RF generator 9.

What is claimed is:

1. An acousto-optical deflector, comprising, in a case, a plurality of crystals and a plurality of piezoelectric transducers associated respectively with the crystals and controlled by a variable frequency RF signal for generating, in the crystals, ultrasonic waves of the same frequency, the crystals being aligned along an acoustic axis for receiving in the aggregate a single incident light beam and generating a single diffracted beam and being spaced apart from each other by a gap creating an acoustic discontinuity without deforming the light beam.

2. The acousto-optical deflector as claimed in claim 1, wherein the piezoelectric transducers are adapted so as to be controlled by the same generator.

3. The acousto-optical deflector as claimed in claim 1, wherein the piezoelectric transducers of the two end crystals are associated respectively with two opposite external acoustic input faces.

4. The acousto-optical deflector as claimed in claim 1, used as a printer scanning mirror.

* * * * *